(12) United States Patent
Uchida

(10) Patent No.: US 11,916,317 B2
(45) Date of Patent: Feb. 27, 2024

(54) RFID TAG AND ANTENNA MEMBER FOR USE IN RFID TAG

(71) Applicant: JAPAN AVIATION ELECTRONICS INDUSTRY, LIMITED, Tokyo (JP)

(72) Inventor: Jun Uchida, Toyko (JP)

(73) Assignee: JAPAN AVIATION ELECTRONICS INDUSTRY, LIMITED, Tokyo (JP)

(*) Notice: Subject to any disclaimer, the term of this patent is extended or adjusted under 35 U.S.C. 154(b) by 0 days.

(21) Appl. No.: 17/850,331

(22) Filed: Jun. 27, 2022

(65) Prior Publication Data

US 2023/0035707 A1 Feb. 2, 2023

(30) Foreign Application Priority Data

Jul. 30, 2021 (JP) ................................ 2021-125269

(51) Int. Cl.
*H01Q 9/26* (2006.01)
*H01Q 1/22* (2006.01)
(Continued)

(52) U.S. Cl.
CPC ......... *H01Q 9/265* (2013.01); *G06K 19/0723* (2013.01); *G06K 19/0775* (2013.01);
(Continued)

(58) Field of Classification Search
CPC .. H01Q 1/2208; H01Q 1/2216; H01Q 1/2225; H01Q 1/36; H01Q 1/38;
(Continued)

(56) References Cited

U.S. PATENT DOCUMENTS 7,570,225 B2    8/2009  Kai et al.
2006/0208095 A1*  9/2006  Yamagajo ........ G06K 19/07372
                                                                235/492
(Continued)

FOREIGN PATENT DOCUMENTS

CN    101053115 B    5/2012
CN    102496776 B  *  1/2014
(Continued)

OTHER PUBLICATIONS

Extended European Search Report (EESR) dated Nov. 21, 2022, issued in counterpart European Application No. 22180315.8.
(Continued)

*Primary Examiner* — Dameon E Levi
*Assistant Examiner* — Leah Rosenberg
(74) *Attorney, Agent, or Firm* — Holtz, Holtz & Volek PC

(57) ABSTRACT

An RFID tag is provided with a base member, an antenna portion and an IC chip. A split-ring resonator portion of the antenna portion has a first part and a second part. First end portions of the first part are provided with a first facing portion and a first connection portion, respectively. Second end portions of the second part are provided with a second facing portion and a second connection portion, respectively. The first and the second facing portions are apart from and face each other. A third end portion of the impedance matching portion is connected to the first part between the first facing portion and the first connection portion, and another third end portion is connected to the second part between the second facing portion and the second connection portion. The IC chip is connected to the first connection portion and the second connection portion.

6 Claims, 2 Drawing Sheets

(51) Int. Cl.
  *G06K 19/077* (2006.01)
  *G06K 19/07* (2006.01)
(52) U.S. Cl.
  CPC . *G06K 19/07773* (2013.01); *G06K 19/07786* (2013.01); *H01Q 1/2208* (2013.01)
(58) Field of Classification Search
  CPC ............... H01Q 9/265; G06K 19/0723; G06K 19/0775; G06K 19/07773; G06K 19/07786
  See application file for complete search history.

(56) References Cited

U.S. PATENT DOCUMENTS

| | | |
|---|---|---|
| 2007/0040028 A1 | 2/2007 | Kawamata |
| 2007/0200711 A1* | 8/2007 | Kai .......................... H01Q 1/36 343/741 |
| 2010/0039232 A1 | 2/2010 | Chang et al. |
| 2010/0156736 A1* | 6/2010 | Chung ................. H01Q 1/2208 343/793 |
| 2015/0009077 A1 | 1/2015 | Lee et al. |

FOREIGN PATENT DOCUMENTS

| | | |
|---|---|---|
| CN | 102496776 B | 1/2014 |
| EP | 1826866 A1 | 8/2007 |
| GB | 2538455 A | 11/2016 |
| JP | 2012095226 A | 5/2012 |
| JP | 2015164258 A | 9/2015 |
| JP | 2015185910 A | 10/2015 |

OTHER PUBLICATIONS

Taiwanese Office Action (and an English language translation thereof) dated Feb. 16, 2023, issued in counterpart Taiwanese Application No. 111123391.

* cited by examiner

RFID TAG AND ANTENNA MEMBER FOR USE IN RFID TAG

CROSS REFERENCE TO RELATED APPLICATIONS

This application is based on and claims priority under 35 U.S.C. § 119 to Japanese Patent Application No. JP2021-125269 filed Jul. 30, 2021, the contents of which are incorporated herein in their entirety by reference.

BACKGROUND OF THE INVENTION

This invention relates to a radio frequency identification (RFID) tag and an antenna member for use in the RFID tag.

A RFID tag is an information memory medium from which and into which information can be read and written using a reader/writer in a noncontact manner. The RFID tag is provided with an antenna for radio communication with the reader/writer. In order to enable the reader/writer, which is a few meters distant from the RFID tag, to read from and write into the RFID tag regardless of a position of the RFID tag and an orientation of the RFID tag, the antenna of the RFID tag needs an isotropic radiation pattern.

JP2012-95226A (Patent Document 1) discloses an example of a noncontact communication medium or an RFID tag. As shown in FIG. 3, a noncontact communication medium 90 of Patent Document 1 is provided with two dipole antennas 92 and 94 and an integrated circuit (IC) chip 96. Each of the dipole antennas 92 and 94 has two radiating elements 920 and 940, the dipole antennas 92 and 94 are arranged to be perpendicular to each other. The IC chip 96 is disposed on an intersection point of the dipole antennas 92 and 94. With this structure, a composite radiation pattern of the dipole antennas 92 and 94 has an approximately isotropic radiation pattern.

SUMMARY OF THE INVENTION

In the noncontact communication medium 90 of Patent Document 1, the IC chip 96 is connected to the two dipole antennas 92 and 94. The IC chip 96 capable of being connected to a plurality of antennas is more expensive than an IC chip capable of being connected to a single antenna. Accordingly, the noncontact communication medium 90 of Patent Document 1 has a problem that it takes a high cost.

It is an object of the present invention to provide an RFID tag which is provided with an antenna having an isotropic radiation pattern and which can reduce a cost thereof.

In addition, it is another object of the present invention to provide an antenna member having an antenna which has an isotropic radiation pattern and which can reduce a cost of an RFID tag.

One aspect of the present invention provides a radio frequency identification (RFID) tag. The RFID tag comprises a base member which is an electrical insulator, an antenna portion formed on the base member and an integrated circuit (IC) chip. The antenna portion has a split-ring resonator portion and an impedance matching portion. The split-ring resonator portion has a first part and a second part. The first part has two first end portions. One of the first end portions is provided with a first facing portion. A remaining one of the first end portions is provided with a first connection portion. The second part has two second end portions. One of the second end portions is provided with a second facing portion. A remaining one of the second end portions is provided with a second connection portion. The first facing portion and the second facing portions are apart from and face each other. The impedance matching portion has two third end portions. One of the third end portions is connected to the first part between the first facing portion and the first connection portion. A remaining one of the third end portions is connected to the second part between the second facing portion and the second connection portion. The IC chip is connected to the first connection portion and the second connection portion.

Another aspect of the present invention provides an antenna member for use in a radio frequency identification (RFID) tag. The antenna member comprises a base member which is an electrical insulator and an antenna portion formed on the base member. The antenna portion has a split-ring resonator portion and an impedance matching portion. The split-ring resonator portion has a first part and a second part. The first part has two first end portions. One of the first end portions is provided with a first facing portion. A remaining one of the first end portions is provided with a first connection portion. The second part has two second end portions. One of the second end portions is provided with a second facing portion. A remaining one of the second end portions is provided with a second connection portion. The first facing portion and the second facing portions are apart from and face each other. The impedance matching portion has two third end portions. One of the third end portions is connected to the first part between the first facing portion and the first connection portion. A remaining one of the third end portions is connected to the second part between the second facing portion and the second connection portion. The first connection portion and the second connection portion are arranged apart from and in proximity to each other.

The RFID tag of the aspect of the present invention is provided with the antenna portion which has the split-ring resonator portion and the impedance matching portion. A radiation pattern of the antenna portion has isotropy on a par with that formed by two dipole antennas arranged to be perpendicular to each other. In other words, the RFID tag of the aspect of the present invention can form an isotropic radiation pattern by using a single antenna. Therefore, the RFID tag of the aspect of the present invention can use an inexpensive IC chip to reduce the cost.

In addition, since the antenna portion of the antenna member according to the other aspect of the present invention can form the isotropic radiation pattern by using the single antenna, the use of an inexpensive IC chip becomes possible and thereby the production of an inexpensive RFID tag becomes possible.

An appreciation of the objectives of the present invention and a more complete understanding of its structure may be had by studying the following description of the preferred embodiment and by referring to the accompanying drawings.

Figure 1:
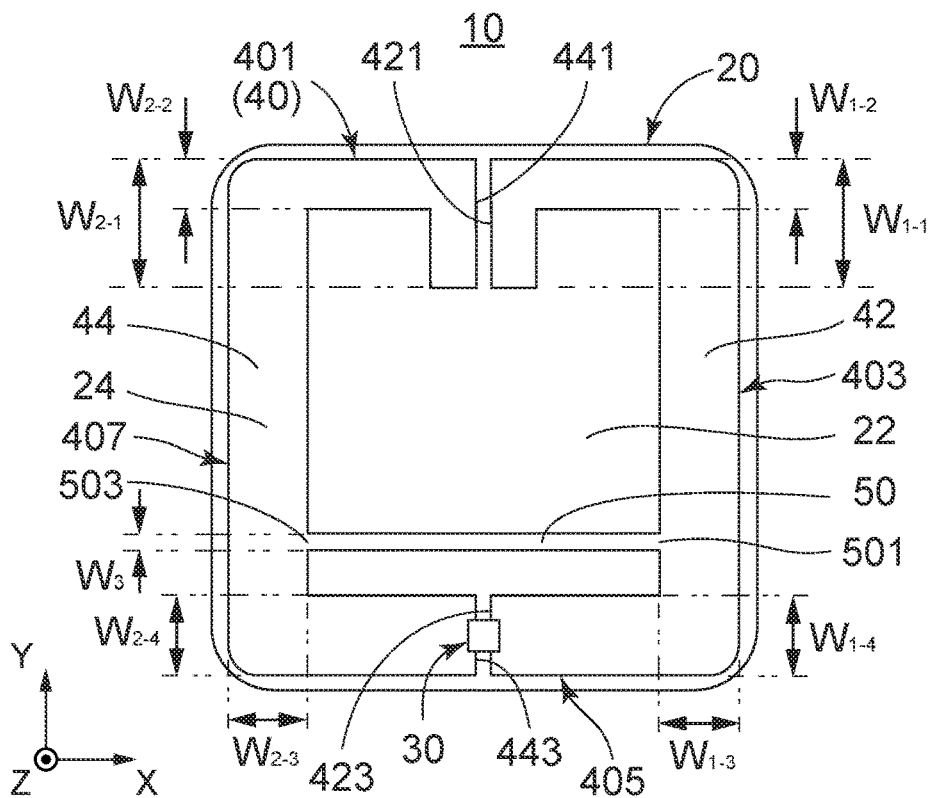
FIG. 1 is a plan view showing a schematic structure of a radio frequency identification (RFID) tag according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

Referring to FIG. 1, a radio frequency identification (RFID) tag 10 according to a first embodiment of the present invention is provided with an antenna member 20 and an integrated circuit (IC) chip 30. The antenna member 20 is provided with a base member 22 and an antenna portion 24 formed on the base member 22. The base member 22 is made of insulating material. The base member 22 may be an insulating film. The antenna portion 24 has a split-ring resonator portion 40 and an impedance matching portion 50. The antenna portion 24 is formed of an aluminum film or conductive ink, for example. In the present embodiment, the antenna portion 24 has a single layer structure composed of a single conductive layer. However, the present invention is not limited thereto. The antenna portion 24 may have a multilayer structure formed of a plurality of conductive layers.

As shown in FIG. 1, the split-ring resonator portion 40 has a first part 42 and a second part 44. The first part 42 and the second part 44 are formed and arranged so that the split-ring resonator portion 40 has an outer shape of an approximately rectangular shape. Accordingly, the split-ring resonator portion 40 has two edges 401 and 405 which extend in a first horizontal direction and two edges 403 and 407 which extend in a second horizontal direction perpendicular to the first horizontal direction. In the present embodiment, the first horizontal direction is an X-direction, and the second horizontal direction is a Y-direction. Hereinafter, for the sake of convenience in the description, the four edges 401, 403, 405 and 407 of the split-ring resonator portion 40 are referred to as a first edge 401, a second edge 403, a third edge 405 and a fourth edge 407, respectively, in a clockwise direction.

As shown in FIG. 1, the first part 42 has two first end portions 421 and 423, and the second part 44 has two second end portions 441 and 443. In the present embodiment, the first part 42 and the second part 44 have shapes axisymmetric to each other and are arranged to be mirror images of each other. However, the present invention is not limited thereto. The first part 42 and the second part 44 may be modified, e.g. not to have the shapes axisymmetric to each other, provided that they are formed and arranged to work as a split-ring resonator.

As shown in FIG. 1, one of the first end portions 421 and 423 and one of the second end portions 441 and 443 are apart from and face each other. In other words, the one of the first end portions 421 and 423 is provided with a first facing portion (421), and the one of the second end portions 441 and 443 is provided with a second facing portion (441). In the present embodiment, the first end portion 421 is provided with the first facing portion 421, and the second end portion 441 is provided with the second facing portion 441. The first facing portion 421 and the second facing portion 441 are apart from and face each other and form a capacitor.

As shown in FIG. 1, a remaining one of the first end portions 421 and 423 and a remaining one of the second end portions 441 and 443 are arranged in proximity to each other to be apart from each other. The remaining one of the first end portions 421 and 423 and the remaining one of the second end portions 441 and 443 are connected to the IC chip 30. In other words, the remaining one of the first end portions 421 and 423 is provided with a first connection portion (423), and the remaining one of the second end portions 441 and 443 is provided with a second connection portion (443). In the present embodiment, the first end portion 423 is provided with the first connection portion 423, and the second end portion 443 is provided with the second connection portion 443. The IC chip 30 is connected to the first connection portion 423 and the second connection portion 443.

As shown in FIG. 1, the impedance matching portion 50 is connected to the first part 42 of the split-ring resonator portion 40 and the second part 44 of the split-ring resonator portion 40. In detail, the impedance matching portion 50 has two third end portions 501 and 503. One of the third end portions 501 and 503 is connected to the first part 42 between the first facing portion 421 and the first connection portion 423. Moreover, a remaining one of the third end portions 501 and 503 is connected to the second part 44 between the second facing portion 441 and the second connection portion 443. In the present embodiment, the third end portion 501 is connected to the first part 42 on the second edge 403 of the split-ring resonator portion 40. In addition, the third end portion 503 is connected to the second part 44 on the fourth edge 407 of the split-ring resonator portion 40. However, the present invention is not limited thereto. The impedance matching portion 50 is not particularly limited in connection position and in shape, provided that it is connected to the first part 42 of the split-ring resonator portion 40 and the second part 44 of the split-ring resonator portion 40. For example, the third end portions 501 and 503 of the impedance matching portion 50 may be connected to the first part 42 and the second part 44, respectively, on the third edge 405 of the split-ring resonator portion 40. In that case, the impedance matching portion 50 may have an angular C-shape. In addition, the shape of the impedance matching portion 50 may have a partly wide portion so that the third end portions 501 and 503 reach the second edge 403 of the split-ring resonator portion 40 and the fourth edge 407 of the split-ring resonator portion 40, respectively. The impedance matching portion 50 may be freely set in connection position and in shape in accordance with desired impedance characteristics.

As understood from FIG. 1, each of the first part 42 and the second part 44 is wider than the impedance matching portion 50 in width. Here, in each of the first part 42, the second part 44 and the impedance matching portion 50, "width" is a size in a direction perpendicular to a longitudinal direction thereof. In the present embodiment, the first part 42 has four widths $W_{1-1}$ to $W_{1-4}$. Similarly, the second part 44 has four widths $W_{2-1}$ to $W_{2-4}$. The impedance matching portion 50 has a single width $W_3$ ($<W_{1-1}$ to $W_{1-4}$, $W_{2-1}$ to $W_{2-4}$). However, the present invention is not limited thereto. Each of the first part 42 and the second part 44 may have a single width. Alternatively, each of the first part 42 and the second part 44 may have two widths so that the first end portion 421 and the vicinity thereof may be wider than the other portion. In addition, the impedance matching portion 50 may have a plurality of widths which are different from each other.

As understood from FIG. 1, the IC chip 30 is mounted on a surface of the base member 22 and connected to the first connection portion 423 and the second connection portion 443. In the present embodiment, the first connection portion 423 and the second connection portion 443 are on the third edge 405. Each of the first connection portion 423 and the second connection portion 443 has a size which is equal to the widths $W_{1-4}$ and $W_{2-4}$ in the second horizontal direction (the Y-direction) and which is larger than a size Wc of the IC chip 30 in the second horizontal direction (the Y-direction), namely Wc<$W_{1-4}$, $W_{2-4}$.

As shown in FIG. 1, the IC chip 30 of the present embodiment is in the middle of the first connection portion 423 or the second connection portion 443 in the second horizontal direction. However, the present invention is not limited thereto. The IC chip 30 may be connected to the first connection portion 423 and the second connection portion 443 in a position close to the inside or the outside of the split-ring resonator portion 40.

In the RFID tag 10 of the present embodiment, the antenna portion 24 can form an isotropic radiation pattern alone. Accordingly, as the IC chip 30 of the RFID tag 10, an inexpensive IC chip can be used.

Second Embodiment

Figure 2:
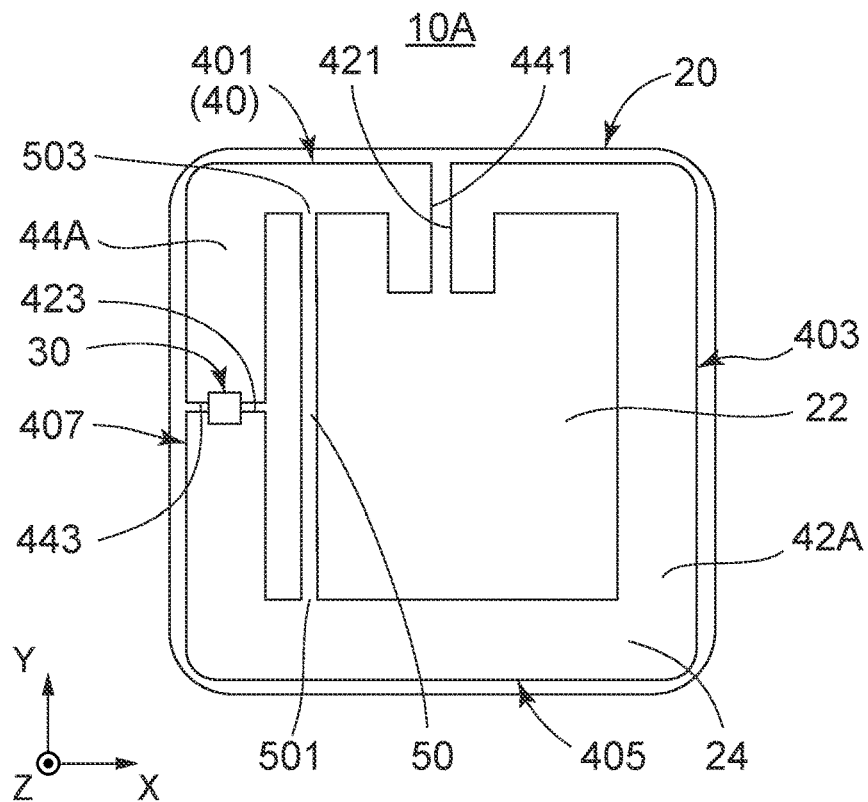
FIG. 2 is a plan view showing a schematic structure of a radio frequency identification (RFID) tag according to a second embodiment of the present invention.
Figure 3:
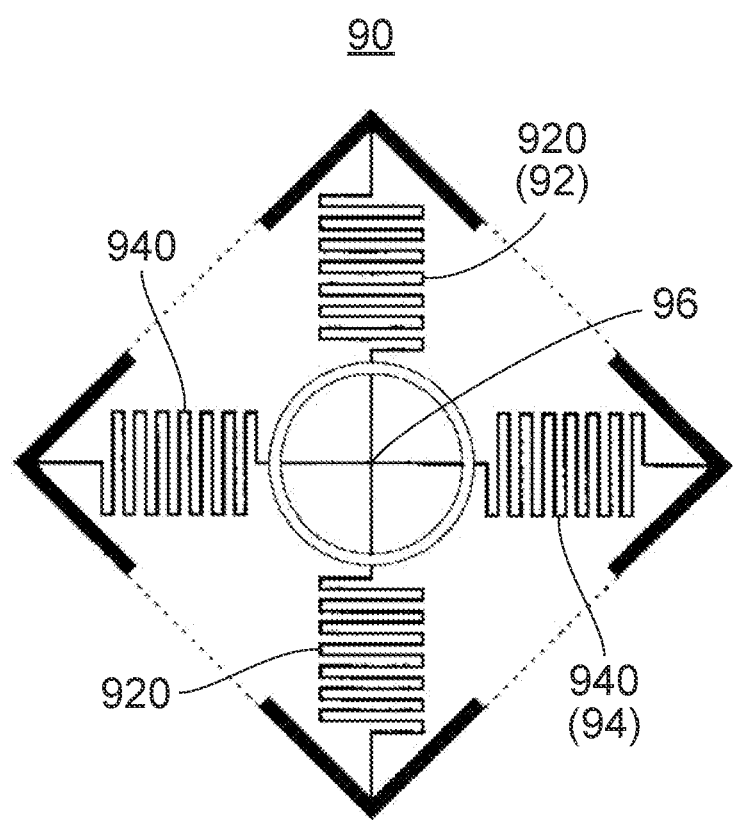
FIG. 3 is a plan view showing a schematic structure of a noncontact communication medium disclosed in Patent Document 1.

Referring to FIG. 2, an RFID tag 10A according to a second embodiment of the present invention has a first part 42A and a second part 44A which are respectively different, in shape, from the first part 42 and the second part 44 of the split-ring resonator portion 40 in the RFID tag 10 of the first embodiment. Other components of the RFID tag 10A are the same as or similar to those of the RFID tag 10, so that they shall be denoted by the same reference signs, and the description of them shall be omitted.

As shown in FIG. 2, the first part 42A of the split-ring resonator portion 40 and the second part 44A of the split-ring resonator portion 40 are formed and arranged so that the split-ring resonator portion 40 has an outer shape of an approximately rectangular shape. A first end portion 421 of the first part 42A and a second end portion 441 of the second part 44A are on a first edge 401 of the split-ring resonator portion 40. Moreover, a first end portion 423 of the first part 42A and a second end portion 443 of the second part 44A are on a fourth edge 407 of the split-ring resonator portion 40.

As shown in FIG. 2, an impedance matching portion 50 is connected to the first part 42A of the split-ring resonator portion 40 and the second part 44A of the split-ring resonator portion 40. A third end portion 501 of the impedance matching portion 50 is connected to the first part 42A between the first facing portion 421 and the first connection portion 423. A third end portion 503 is connected to the second part 44A between the second facing portion 441 and the second connection portion 443. In the present embodiment, the third end portion 501 is connected to the first part 42A on a third edge 405 of the split-ring resonator portion 40, and the third end portion 503 is connected to the second part 44A on the first edge 401 of the split-ring resonator portion 40. However, the present invention is not limited thereto. The impedance matching portion 50 is not particularly limited in connection position and in shape, provided that it is connected to the first part 42A of the split-ring resonator portion 40 and the second part 44A of the split-ring resonator portion 40. For example, the third end portions 501 and 503 of the impedance matching portion 50 may be connected to the first part 42A and the second part 44A, respectively, on the fourth edge 407 of the split-ring resonator portion 40. In that case, the impedance matching portion 50 may have an angular C-shape. In addition, the shape of the impedance matching portion 50 may have a partly wide portion so that the third end portions 501 and 503 reach the third edge 405 of the split-ring resonator portion 40 and the first edge 401 of the split-ring resonator portion 40, respectively.

As understood from FIG. 2, also in the present embodiment, each of the first part 42A and the second part 44A is wider than the impedance matching portion 50 in width. In addition, each of the first connection portion 423 and the second connection portion 443 is larger than the IC chip 30 in size in the second horizontal direction (the X-direction).

Also in the RFID tag 10A of the present embodiment, the antenna portion 24 can form an isotropic radiation pattern alone. Accordingly, as the IC chip 30 of the RFID tag 10A, an inexpensive IC chip can be used.

Although the specific explanation about the present invention is made above with reference to the embodiments, the present invention is not limited thereto but susceptible of various modifications and alternative forms without departing from the spirit of the invention. For example, in the antenna portion 24, the widths of each portion or part, the positions of the first facing portion 421 and the second facing portion 441, and the positions of the first connection portion 423 and the second connection portion 443 can be freely set in accordance with desired antenna characteristics.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A radio frequency identification (RFID) tag comprising:
    a base member which is an electrical insulator;
    an antenna portion formed on the base member; and
    an integrated circuit (IC) chip, wherein:
    the antenna portion has a split-ring resonator portion and an impedance matching portion;
    the split-ring resonator portion has a first part and a second part;
    the first part has two first end portions;
    one of the first end portions is provided with a first facing portion;
    a remaining one of the first end portions is provided with a first connection portion;
    the second part has two second end portions;
    one of the second end portions is provided with a second facing portion;
    a remaining one of the second end portions is provided with a second connection portion;
    the first facing portion and the second facing portions are apart from and face each other;
    the impedance matching portion has two third end portions;
    one of the third end portions is connected to the first part between the first facing portion and the first connection portion;
    a remaining one of the third end portions is connected to the second part between the second facing portion and the second connection portion; and
    the IC chip is connected to the first connection portion and the second connection portion.

2. The RFID tag as recited in claim 1, wherein the split-ring resonator portion has two edges extending in a first horizontal direction and two edges extending in a second horizontal direction perpendicular to the first horizontal direction.

3. The RFID tag as recited in claim 2, wherein each of the first part and the second part is wider than the impedance matching portion in width.

4. The RFID tag as recited in claim 2, wherein:
the first connection portion and the second connection portion are located on one of the edges extending in the first horizontal direction, and
the first connection portion and the second connection portion are larger than the IC chip in size in the second horizontal direction.

5. The RFID tag as recited in claim 1, wherein the antenna portion has a single layer structure.

6. An antenna member for use in a radio frequency identification (RFID) tag, the antenna member comprising:
a base member which is an electrical insulator; and
an antenna portion formed on the base member, wherein:
the antenna portion has a split-ring resonator portion and an impedance matching portion;
the split-ring resonator portion has a first part and a second part;
the first part has two first end portions;
one of the first end portions is provided with a first facing portion;
a remaining one of the first end portions is provided with a first connection portion;
the second part has two second end portions;
one of the second end portions is provided with a second facing portion;
a remaining one of the second end portions is provided with a second connection portion;
the first facing portion and the second facing portions are apart from and face each other;
the impedance matching portion has two third end portions;
one of the third end portions is connected to the first part between the first facing portion and the first connection portion;
a remaining one of the third end portions is connected to the second part between the second facing portion and the second connection portion; and
the first connection portion and the second connection portion are arranged apart from and in proximity to each other.

* * * * *

UNITED STATES PATENT AND TRADEMARK OFFICE
CERTIFICATE OF CORRECTION

| | | |
|---|---|---|
| PATENT NO. | : 11,916,317 B2 | |
| APPLICATION NO. | : 17/850331 | |
| DATED | : February 27, 2024 | |
| INVENTOR(S) | : Jun Uchida | |

It is certified that error appears in the above-identified patent and that said Letters Patent is hereby corrected as shown below:

On the Title Page

Item (72), delete "Toyko" and insert --TOKYO--.

Signed and Sealed this
Ninth Day of April, 2024

Katherine Kelly Vidal
*Director of the United States Patent and Trademark Office*